Aug. 30, 1938.   S. F. TORSTENSSON   2,128,336

INSULATION

Filed March 19, 1937

INVENTOR.
BY Sture Folke Torstensson
his ATTORNEY.

Patented Aug. 30, 1938

2,128,336

UNITED STATES PATENT OFFICE 2,128,336

INSULATION

Sture Folke Torstensson, Stockholm, Sweden

Application March 19, 1937, Serial No. 131,888
In Germany March 25, 1936

4 Claims. (Cl. 72—16)

My invention relates to thermal insulation and more particularly hermetically sealed insulation comprising finely divided material forming cells in which the pressure is below atmospheric pressure.

It is an object of my invention to provide a new and improved method of producing insulation of this type.

I provide a casing which may be of thin sheet metal and fill this casing with a sludge comprising a finely divided material mixed with a suitable liquid and then remove the liquid, as by evaporation, leaving the finely divided material in place in the casing. The casing is then evacuated and sealed.

My invention, together with the objects and advantages thereof, will be more fully understood upon reference to the following description taken in connection with the accompanying drawing forming part of this specification and of which:

Figures 1, 2, 3:
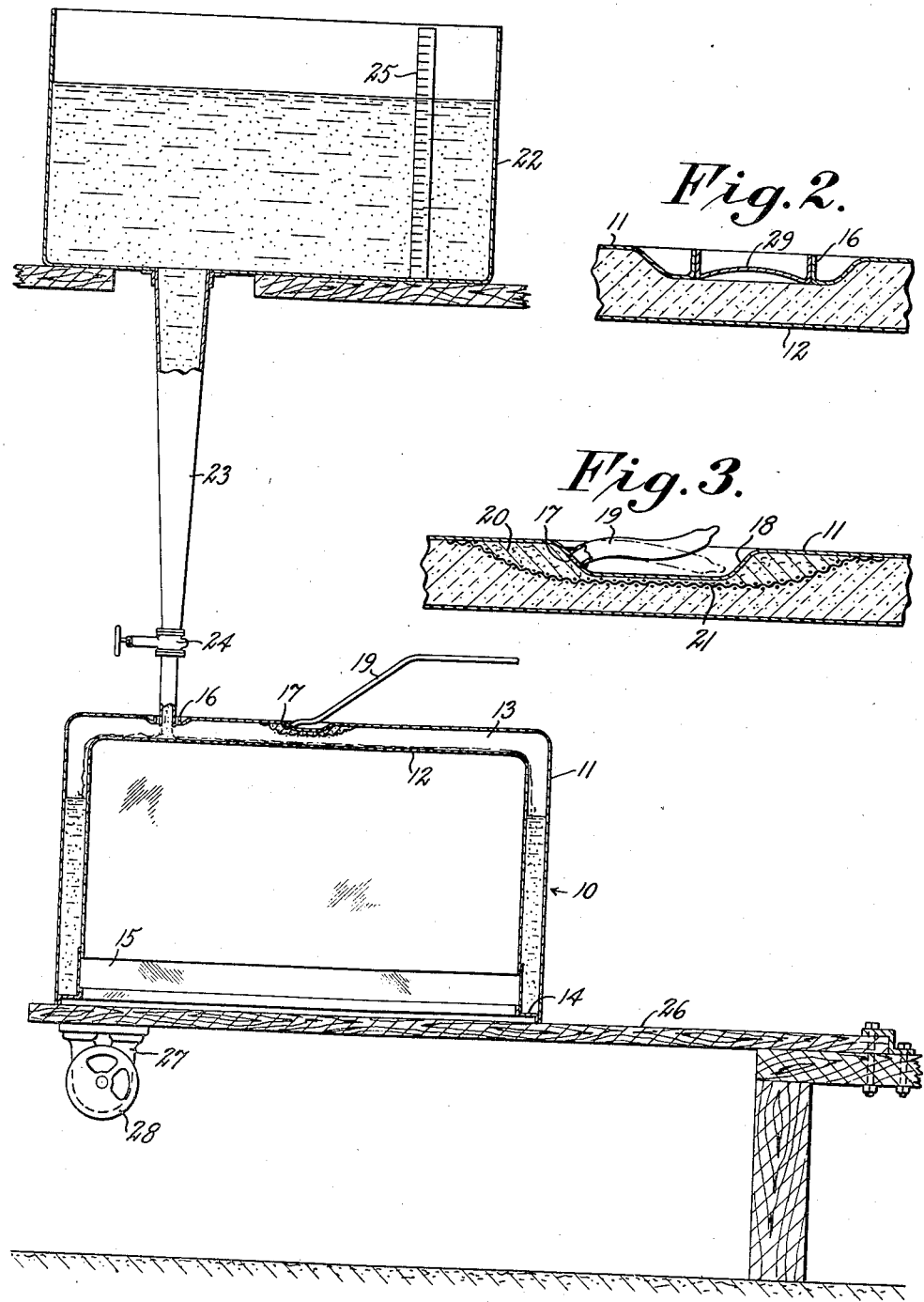
Fig. 1 shows schematically, with parts in vertical section, an apparatus for carrying out the method of my invention.
Fig. 2 is a detail sectional view illustrating a closure for the filling opening of the insulation casing shown in Fig. 1.
Fig. 3 is a detail sectional view showing the sealing connection for evacuating the insulation casing shown in Fig. 1.

Referring to Fig. 1 of the drawing, a thermal insulating element 10 comprises an outer sheet metal wall 11 and an inner sheet metal wall 12 forming therebetween a space 13 of a desired thickness. The edges of the metal shells 11 and 12 are connected by a peripheral flanged member 14 and a strip 15 of sheet metal of relatively poor thermal conductivity to reduce heat transfer between the inner and outer shells.

The outer shell 11 is provided with a suitable filling opening 16 and an evacuation opening 17. As more clearly seen in Fig. 3, the evacuation opening 17 is provided in a depressed portion 18 of the outer shell 11, and one end of a sealing tube 19 communicates with the opening 17 and is attached to the shell 11 around the opening 17. Suitable coarse granulated material 20 is held in place around the opening 17 by means of a screen 21. The filling opening 16 is also provided in a slight depression in the outer shell 11 and has an upturned peripheral flange as seen in Fig. 2.

In accordance with my invention I introduce into the space 13 a mixture of a finely divided material such as siliceous guhr and water or alcohol or other suitable liquid. The mixture, which may be referred to as a sludge, is contained in a tank 22 having a discharge funnel 23 controlled by a valve 24. The tank 22 may be provided with a suitable scale or indicator 25 to show the quantity of sludge discharged therefrom upon opening of valve 24. The insulating element 10 is advantageously placed on a springboard 26 below the funnel 23 so that the lower end of the funnel extends into the filling opening 16. On the springboard 26 there is also mounted a motor 27 having a biased or eccentric flywheel 28. The tank 22 may be separately mounted or it may also be mounted on the springboard 26. The tank 22 is filled with sludge and the valve 24 opened to permit the sludge to descend through the funnel 23, through the filling opening 16, and into the space between the walls 11 and 12. During this procedure the motor 27 is operated to cause shaking of the insulating element to cause the sludge to be evenly deposited throughout the space 13. When the required amount of sludge has been deposited in the space 13 to completely fill the same, the funnel 23 is raised out of the filling opening 16 and the latter closed and sealed by a cap 29 having upturned flanges which are welded to the flanges around the filling opening 16.

The evacuation tube 19 is next connected to a liquid pump which withdraws liquid from the space 13, leaving the solid matter in place. To effect complete removal of moisture, the insulating element 10 is heated in an oven while the evacuation tube 19 is connected to a vapor pump so that liquid is vaporized in the space 13 and drawn off by the pump. By means of the evacuation tube 19, an increasingly finer vacuum is drawn in the space 13 until the pressure therein has been reduced to between 0.1 and 2 mm. Hg. Thereupon the tube 19 is sealed off and bent into the depression 18 which may then be filled with a sealing compound such as pitch to protect the tube 19. The amount of vacuum space with respect to the solid material may be determined by the proportion of siliceous guhr or the like mixed with water to form the sludge. In other words, the heavier the sludge the greater the amount of space 13 occupied by solid material, and vice versa. Since the porous solid material in the space 13 acts to support the walls 11 and 12 against external pressure, these walls are advantageously made very thin, and if very thin walls are provided, it will be necessary to use a suitable supporting structure for the element 10 during the filling process described above.

I claim:

1. The method of producing thermal insulation which comprises introducing a mixture of liquid and finely divided solid material into a hollow wall structure, removing the liquid, leaving the solid material in place in the wall structure, evacuating the hollow wall structure, and hermetically sealing the same.

2. A method as set forth in claim 1 in which the hollow wall structure is agitated during the step of filling with the mixture of liquid and solid material.

3. A method as set forth in claim 1 in which the amount of space between the solid material in the insulation product is determined by the proportion of liquid in the filling mixture.

4. A method as set forth in claim 1 in which the liquid is removed by evaporation thereof and withdrawal of the vapor.

STURE FOLKE TORSTENSSON.